(12) United States Patent
Oborný et al.

(10) Patent No.: US 10,399,038 B2
(45) Date of Patent: Sep. 3, 2019

(54) TUBULAR MEMBRANE WITH A HELICAL RIDGE, AS WELL AS A METHOD AND APPARATUS FOR PRODUCING SUCH A TUBULAR MEMBRANE

(71) Applicant: X-Flow B.V., Enschede (NL)

(72) Inventors: Radek Oborný, Enschede (NL); Stefan Koel, Hengelo (NL); Jens Potreck, Ahaus-alstätte (DE)

(73) Assignee: X-Flow B.V., Enschede (NL)

( * ) Notice: Subject to any disclaimer, the term of this patent is extended or adjusted under 35 U.S.C. 154(b) by 385 days.

(21) Appl. No.: 15/112,218

(22) PCT Filed: Jan. 12, 2015

(86) PCT No.: PCT/NL2015/050016
§ 371 (c)(1),
(2) Date: Jul. 18, 2016

(87) PCT Pub. No.: WO2015/108415
PCT Pub. Date: Jul. 23, 2015

(65) Prior Publication Data
US 2016/0332120 A1    Nov. 17, 2016

(30) Foreign Application Priority Data
Jan. 20, 2014   (NL) .................................... 2012109

(51) Int. Cl.
| | |
|---|---|
| *B01D 63/06* | (2006.01) |
| *B29C 41/20* | (2006.01) |
| *B29C 53/58* | (2006.01) |
| *B29C 53/82* | (2006.01) |
| *B29C 65/08* | (2006.01) |
| *B29K 67/00* | (2006.01) |
| *B29L 31/14* | (2006.01) |
| *B29K 105/04* | (2006.01) |

(52) U.S. Cl.
CPC ......... *B01D 63/063* (2013.01); *B01D 63/061* (2013.01); *B29C 41/20* (2013.01); *B29C 53/585* (2013.01); *B29C 53/821* (2013.01); *B29C 65/08* (2013.01); *B29K 2067/00* (2013.01); *B29K 2105/04* (2013.01); *B29L 2031/14* (2013.01)

(58) Field of Classification Search
CPC .. B01D 63/063; B01D 63/061; B29C 53/585; B29C 53/821; B29C 65/08; B29C 41/20; B29K 2067/00
See application file for complete search history.

(56) References Cited

FOREIGN PATENT DOCUMENTS

| | | |
|---|---|---|
| EP | 0081182 A2 | 6/1983 |
| FR | 2736843 A1 | 1/1997 |
| GB | 1325672 A | 8/1973 |
| GB | 2188563 A | 10/1987 |

*Primary Examiner* — Vishal V Vasisth
(74) *Attorney, Agent, or Firm* — Quarles & Brady LLP (57) ABSTRACT

A tubular membrane includes a support tube made out of one or more flexible tapes of porous support material which have been helically wound into a tube shape with overlapping tape edges which have been sealed to each other, and a semi-permeable membrane layer made of membrane forming material on an inner wall of the support tube. At least one inwardly projecting helical ridge is provided on the inner wall of the support tube, which helical ridge is covered with or forms part of the membrane layer.

15 Claims, 5 Drawing Sheets fig. 1 fig. 2 fig. 3 fig. 4 fig. 5 fig. 6 fig. 7 fig. 8 fig. 9

TUBULAR MEMBRANE WITH A HELICAL RIDGE, AS WELL AS A METHOD AND APPARATUS FOR PRODUCING SUCH A TUBULAR MEMBRANE

CROSS-REFERENCE TO RELATED APPLICATIONS

This application is the National Stage of International Application No. PCT/NL2015/050016 filed Jan. 12, 2015, which claims the benefit of Netherlands Application No. NL 2012109, filed Jan. 20, 2014, the contents of which is incorporated by reference herein.

FIELD OF THE INVENTION

The invention relates to the field of tubular membranes of the type comprising a support tube which is built up out of one or more flexible tapes of porous support material which have been helically wound into a tube shape with overlapping tape edges which have been sealed to each other, and with a semi-permeable membrane layer made of membrane forming material on an inner wall of the support tube. This specific type of tubular membrane shall be referred to as helically wound tubular membrane.

BACKGROUND OF THE INVENTION

Such helically wound tubular membranes as well as a method and apparatus for producing them are known from for example GB-1 325 672. This publication describes helically winding on a winding section of a mandrel one or more porous fibrous tapes to produce a single or multi-ply tube, and continuously casting as a liquid dope a semi-permeable membrane onto the inside of the tube formed on the mandrel. The casting is done in situ in one go, that is to say when the tubular membrane is formed on the mandrel. For this the casting takes place along a casting section of the mandrel which adjoins the winding section of the mandrel. After the casting a continuous doctoring takes place in which the membrane forming material gets equally distributed with a desired layer thickness over the inner wall of the support tube. The doctoring is also done in situ in one go, that is to say when the tubular membrane is formed on the mandrel. For this the doctoring takes place along a doctoring section of the mandrel which adjoins the casting section of the mandrel.

The thus made helically wound tubular membranes have substantially smooth, round inner surfaces which act as separation layer and are suitable to be used in for example cross flow modules for filtration processes. Fluid to be filtered is fed to one of the outer ends of the tubular membranes. Permeate flows through the membrane layer, while solutes and/or particles present in the fluid are rejected and drained away as retentate. In such smooth tubular membranes a mainly laminar flow takes place alongside the inner surface of the membrane layer. This laminar flow is referred to as the boundary layer and does not get (well) mixed with the main flow of fluid through the tubular membrane.

The most significant limitations to filtration performances of such tubular membranes are concentration polarization near the membrane layer, the buildup of a cake along the membrane layer and fouling of the membrane layer. Concentration polarization is defined as accumulation of rejected solutes near the membrane layer, which results in higher solutes concentrations being present there. The concentrations of the rejected solutes near the membrane layer may increase up to 100 times. When the concentrations of the solutes get too high, a gel may even start to precipitate onto the membrane layer. This gel then aids to the forming of a solid cake.

The only way the rejected solutes can get away from the membrane layer is by back-diffusion down the concentration gradient. The rate of back-diffusion of the solutes out of the boundary layer into the main flow is governed by the diffusivity of those solutes, and by the thickness of the boundary layer. Since the diffusivity of the rejected solutes is physically determined, this parameter can not be influenced. The thickness of the boundary layer however can be manipulated by changing the cross flow velocity and/or by influencing the flow patterns inside the tubular membranes, like promoting local turbulences and secondary flows.

For this purpose it is already well known from the state of the art to place turbulence enhancers and secondary flow inducers inside tubular membranes in order to modify the flow patterns therein and in particular help to reduce the thickness of the boundary layer.

For example it has been known to place helical coil inserts inside tubular membranes. The windings of those coil inserts then come to lie against the membrane layer and as it were form ridges thereupon. Those ridges cause turbulences and secondary flows to occur in front and behind them, thus mixing the boundary layer and helping to minimize concentration polarization, buildup of cake and fouling along the membrane layer.

The use of such helical coil inserts however has the disadvantage that the coil inserts can only be drawn through tubular membranes after first having been elastically stretched to such an extent that they have become more slender than the inner diameter of the tubular membranes themselves. Subsequently they need to be carefully pulled through the tubular membranes while remaining in those stretched positions such that they cannot harm the vulnerable membrane layers. Only then can the coil inserts be released such that they can take back their original position and with this come to lie against the membrane layers of the tubular membranes. As one can imagine this is a time-consuming and difficult operation which cannot be performed in large numbers on an industrial scale, particularly for smaller diameter membrane tubes.

In the article "Hydrodynamic aspects of filtration anti-fouling by helically corrugated membranes" in the name of L. Broussous, P. Schmidtz, H. Boisson, E. Prouzet and A. Larbot in the Journal "Chemical Engineering Science" 55 (2000) 5049-5057, mention is being made of a ceramic tubular membrane geometry with a helical relief stamp at the membrane surface in order to maintain a high level of turbulence close to the surface during filtration. For the production of such a ceramic type tubular membrane, during a first step a macro-porous ceramic support tube needs to be extruded. The relief stamp is co-extruded with the ceramic support tube. For this a special extrusion head is needed with a rotating inner part. Subsequently the extruded corrugated ceramic support tube needs to be baked in an oven. Only after that, in a final step, the baked corrugated ceramic support tube needs to be provided with a membrane layer on its inner wall.

A disadvantage hereof is that a relative complex extrusion process is needed. Furthermore it is limited to ceramic support tubes, which are relative expensive to manufacture. Finally it appeared that only gradually sloping corrugations could be obtained as relief stamp at the membrane surface with this manufacturing method, leading to only a limited reduction of the boundary layers and thus only to a limited increase in performances.

SUMMARY OF THE INVENTION

The present inventions aims to overcome one or more of the above mentioned disadvantages or to provide a useful alternative. In particular the invention aims to provide a tubular membrane which includes further improved means for promoting local turbulences and secondary flows and which can be manufactured in an economic manner in an industrial production method with the aid of a suitable apparatus.

This aim is achieved by a tubular membrane according to the present invention. This tubular membrane is of the helically wound type as defined above, that is to say that it comprises a support tube which has been made out of one or more flexible tapes of porous support material which have been helically wound into a tube shape with overlapping tape edges which have been sealed to each other. A semi-permeable membrane layer made of membrane forming material is present on an inner wall of the support tube. According to the invention at least one inwardly projecting helical ridge is provided on said inner wall of the support tube. This helical ridge is covered with or forms part of the membrane layer.

According to the invention it has for the first time become possible to provide helically wound tubular membranes with an integral helical ridge. It has appeared that for this type of helically wound tubular membranes it is even possible to make those helical ridges in situ in one go with the other steps of winding and casting needed for the making of the tubular membranes. For this the invention provides an advantageous production method and apparatus with which the inventive helically wound tubular membranes with integrated helical ridge can easily be manufactured on an industrial scale in an economic manner. This method and apparatus shall be dealt with in more detail below.

Since the ridge is covered with or forms part of the membrane layer, it advantageously has got the same surface properties as the remaining smooth surface of the membrane layer and thus does not restrict permeation or retention of the membrane.

The ridge can be given axial and radial dimensions large enough to obtain the desired turbulences and secondary flows in the boundary layer, while at the same time not significantly obstructing the membrane cross section and thus does not lead to a blocking thereof. For this the ridge preferably has a thickness of between 0.1-10 mm and/or a thickness of between 1-30% of the inner diameter of the tubular membrane.

The ridge can be given a helical shape with a pitch large enough to prevent the fluid from starting to flow over adjacent ridges without the desired turbulences and secondary flows to start occurring. For this the helical ridge preferably has a pitch of between 5-50 mm.

The adding of such a helical ridge to this type of helically wound tubular membranes has appeared to result in the occurrence of turbulences and secondary flows just in front and behind the helical ridges. Those turbulences and secondary flows help to keep the boundary layer well mixed with the rest of the fluid flowing through the tubular membrane. The occurrence of the turbulences and secondary flows inside the boundary layer at the surface of the membrane layer leads to a thinner boundary layer, to less concentration polarization and less cake formation. This enables higher permeate fluxes compared to smooth cylindrical membranes without such helical ridges, albeit at the cost of a somewhat higher pressure drop. In fact it has even appeared that the performances of this type of helically wound tubular membranes can be increased with more than 50%. Such higher operational fluxes may lead to important capital savings due to less membrane area being required and/or may also contribute to a lower specific energy consumption (kWh per cubic meter of treated fluid) during filtration. Those advantages have appeared to go for the entire range of tubular membrane based filtration, from microfiltration, ultrafiltration, nanofiltration to reverse osmosis, they all may benefit from the invention.

In a particular embodiment the helical ridge has been made out of porous or semi-permeable material. This has the advantage that not only the surface properties of the ridge are the same as the membrane layer, but that the permeate is able to flow through the entire ridge. The ridge thus does not form an obstacle for the permeate flow itself.

In a further embodiment the ridge can be made in its entirety out of a same or similar membrane material as the semi-permeable membrane layer. This can for example be PES, PSF, PVDF, PP or PA or blends thereof. The ridge then advantageously can be made in one casting step with the making of the membrane layer.

In the alternative the ridge can also be made out of a same or similar porous support material as the flexible tape(s) out of which the support tube is formed. This can for example be a non-woven of PP, PET, PA, PBT or blends thereof. The ridge then advantageously can be made in one go with the helical winding of the tape(s) into the tube shape and subsequently be covered with the membrane layer.

Further preferred embodiments of the tubular membrane are described herein.

The invention also relates to a method for producing such a helically wound tubular membrane with integral helical ridge. This method comprises the step of making a support tube out of one or more flexible tapes of porous support material by having the tape(s) helically wound with overlapping tape edges into a tube shape around a winding section of a mandrel. With this the support tube continuously rotates and moves forward relative to the mandrel while the overlapping tape edges are sealed to each other. In a next step a semi-permeable membrane layer of membrane forming material is made on an inner wall of the support tube. According to the inventive thought at least one inwardly projecting helical ridge is formed on said inner wall of the support tube. This helical ridge, during the making of the support tube and membrane layer, gets covered with or forms part of the membrane layer.

In a particular embodiment the ridge during its forming, gets guided through one or more helical grooves in the mandrel. This advantageously makes it possible to use one and the same mandrel for the production process.

In a preferred embodiment the step of making the membrane layer comprises a depositing of a liquid dope of the membrane forming material onto said inner wall of the support tube by guiding the support tube over a casting section of the mandrel. During this step, the casting section is fed with pressurized membrane forming material. As a next step a doctoring may take place of the deposited membrane forming material along said inner wall of the support tube by guiding them over a doctoring section of the mandrel. During this doctoring the integrally formed ridge is guided through a first one of said one or more helical grooves which for that is present in the doctoring section of the mandrel.

In a first embodiment the ridge is cast and doctored of membrane forming material onto a previously casted and doctored membrane layer, or is cast and doctored together with the casting and doctoring of the membrane layer. During this casting and doctoring of the ridge along the casting and doctoring sections of the mandrel, the ridge gets the freedom to run through a helical groove which is provided in the doctoring section of the mandrel.

In a second embodiment the ridge is formed by a flexible ribbon-shaped ridge which is helically wound together with the tape(s) around the winding section of the mandrel. This ribbon-shaped ridge preferably is made of porous material. For this second embodiment the ribbon-shaped ridge may either be already present on and connected to the tape and thus automatically get helically wound together with the tape around the winding section of the mandrel, either be supplied as separate part to the winding section of the mandrel and there get helically wound together with the tape and sealed to the tape. During this helically winding of the ribbon-shaped ridge together with the tape around the winding section of the mandrel, the ribbon-shaped ridge gets the freedom to run through a helical groove which is provided in the winding section of the mandrel.

Further preferred embodiments of the production method are described herein.

The invention also relates to an apparatus for producing such a helically wound tubular membrane with integral helical ridge. According to the invention this apparatus comprises a mandrel which is provided with one or more helical grooves in its outer circumferential wall for guiding the at least one inwardly projecting helical ridge through during its forming on the inner wall of the support tube. If the ridge is made during the winding phase, a first and second helical groove needs to be present in both the winding and doctoring section of the mandrel. If the ridge is made during the casting/doctoring phase, only a helical groove needs to be present in the doctoring section of the mandrel.

Further preferred embodiments of the apparatus are described herein.

BRIEF DESCRIPTION OF THE DRAWINGS

The invention shall be explained in more detail below with reference to the accompanying drawings, in which.

DETAILED DESCRIPTION OF THE INVENTION

Figure 1:
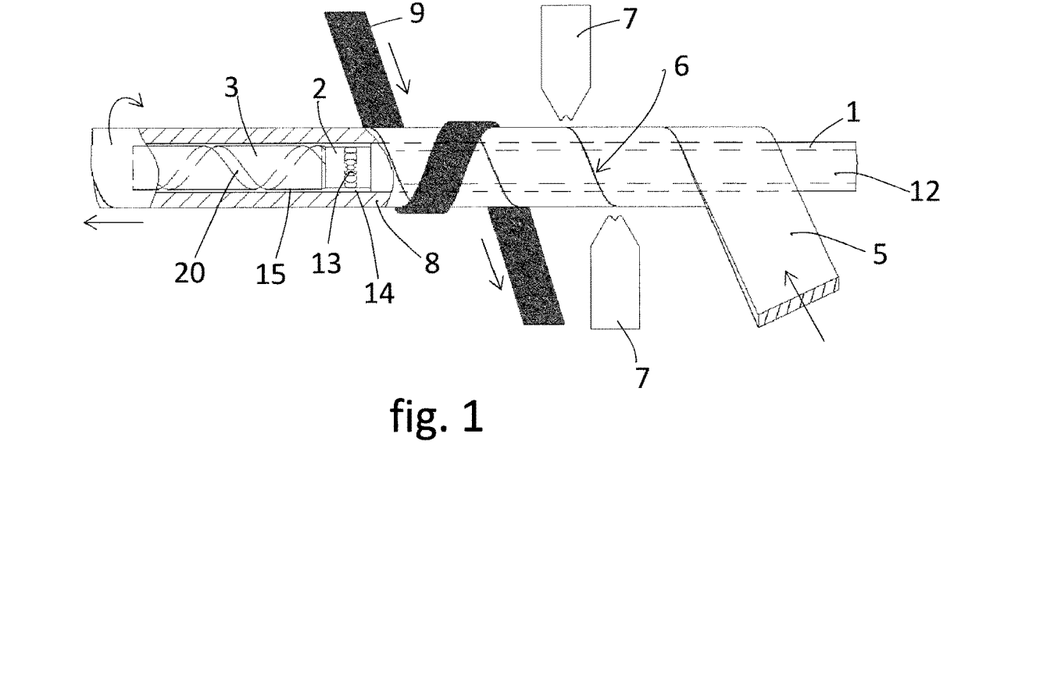
FIG. 1 schematically shows a first embodiment of an apparatus for producing tubular membranes according to the invention.

In FIG. 1 the apparatus for the production of helically wound tubular membranes comprises a mandrel. This mandrel comprises a winding section 1, a casting section 2 and a doctoring section 3. A flexible tape 5 of porous support material by is supplied from suitable feeding means, for example a reel (not shown), towards the winding section 1. This tape 5, which is formed of one or more layers of woven and/or non-woven porous material, for example a polyester, is helically wound with overlapping tape edges 6 into a tube shape around the winding section 1. The overlapping tape edges 6 are sealed to each other by means of suitable sealing means 7, which for example can be ultrasonic sealing means. Thus a helically wound sealed support tube 8 is formed.

A driven endless belt 9 which runs around the support tube 8 near the end of the winding section 1 is provided as drive means for continuously rotating and moving forward the support tube 8 at an aimed speed over to the mandrel sections 1-3.

A channel 12 runs through the centre of the winding section 1 and connects at the casting section 2 to a number of outlet openings 13 divided around the circumference thereof. The outlet openings 13 open out in a circumferential feeding space which lies between the casting section 2 and the support tube 8. Feeding means (not shown) which lead to a supply of a dope of membrane forming material connect to the channel 12. The feeding means are designed to feed a dope of membrane forming material 14, for example a polymer, under pressure to the space. There the membrane forming material 14 is deposited onto the inner wall of the support tube 8. Subsequently, as the support tube 8 with the membrane forming material 14 deposited thereon, is forced to move rotating forward along the doctoring section 3, the membrane forming material 14 automatically gets doctored to a membrane layer 15. In a final step the thus formed tubular membrane can be cured or leached in a suitable hot or cold fluid, for example by means of phase inversion or coagulation, and/or dried to the air.

For obtaining a tubular membrane with an inner diameter d1 of the support tube 8 and an inner diameter d2 of the membrane layer 15, the sections of the mandrel are given the following dimensions. The winding section 1 is made cylindrical and has a diameter Dw which substantially corresponds to the inner diameter d1 of the support tube 8 to be formed. The doctoring section 3 is also cylindrical and has a diameter Dd which substantially corresponds to the inner diameter d2 of the membrane layer 15 to be formed. The casting section 2 has a diameter Dc which is smaller than the diameter Dd of the doctoring section 3 as well as smaller than the diameter Dw of the winding section 1.

According to the invention the doctoring section 3 is provided with an upstream helical groove 20 which extends over the entire length of the doctoring section 3 and on one end connects to the space around the casting section 2. During the casting and doctoring of the membrane layer 15, the helical groove 20 automatically and at the same time casts/doctors a ridge 21 of membrane forming material. The dope extruded from the casting section 2 is thus not merely doctored equally along the whole perimeter but also gets to form the ridge 21. Because of the forward rotating movement of the support tube along the doctoring section 3, this ridge 21 gets to follow a continuous helically spiraling line along the inner wall of the support tube 8. See FIG. 2. During production, this ridge 21 keeps on running through the helical groove 20 during the forward rotating movement of the support tube 8 along the entire doctoring section 3. This gives the ridge 21 enough time to be neatly casted and doctored integrally with the rest of the membrane layer 15. Thus not only the membrane layer 15 gets casted and doctored onto the support tube 8 but also the helical ridge 21. The helical ridge 21 as it were forms part of the membrane layer 15 since it is made in one go out of the same material and thus forms an integral assembly therewith.

Figure 2:
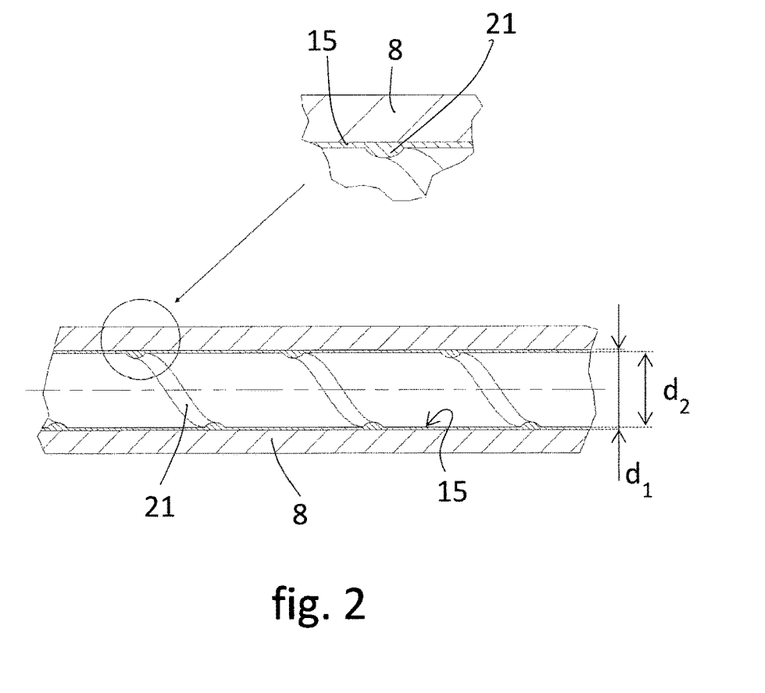
FIG. 2 shows a longitudinal section of a tubular membrane made with the apparatus of FIG. 1.

The cross-sectional shape and dimensions of the ridge 21 can easily be chosen as desired by the shape and dimensions of the groove 20. The pitch of the helical ridge 21 to be formed shall be dependent on the pitch of the helical groove 20. The speed at which the support tube 8 gets to move rotating forward over the mandrel needs to be carefully adjusted such that it corresponds to the speed at which the helical ridge 21 gets to run through the helical groove 20.

Figure 3:
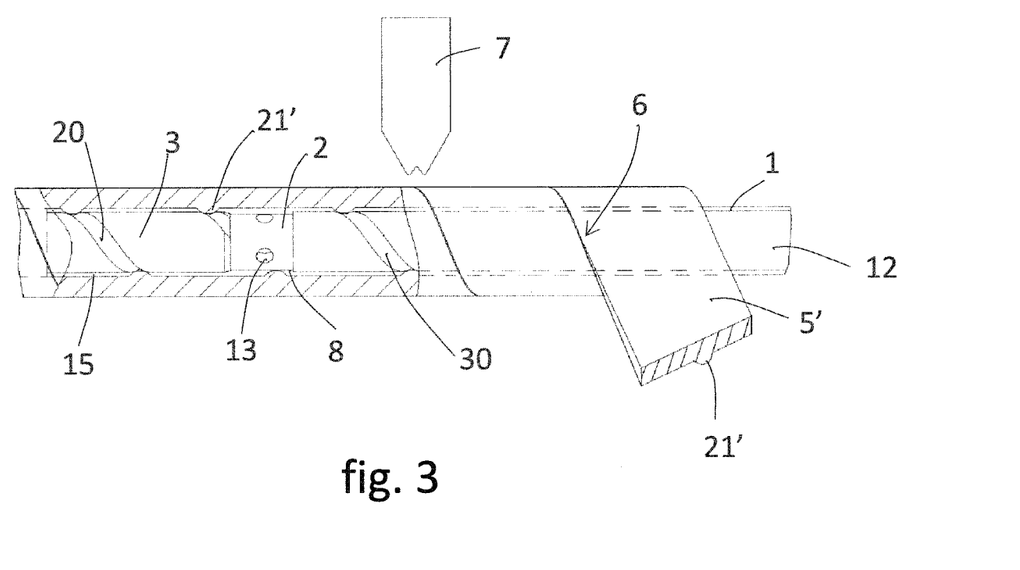
FIG. 3 schematically shows a second embodiment of an apparatus for producing tubular membranes according to the invention.

In FIG. 3 a second embodiment is shown of the apparatus in which similar parts have been given the same reference numerals. This time a tape 5' is supplied to the winding section 1 which already comprises an integrally connected or formed ridge 21' on it. This ridge 21' is made out of the same or a similar type of porous material as the rest of the tape 5'. Furthermore in FIG. 3 the winding section 1 is provided with a downstream helical groove 30.

During winding, the ridge 21' gets to run through the downstream helical groove 30 and thus gets helically wound along with the rest of the tape 5' around the winding section 1 into the tube shaped support tube 8. When the support tube 8 with its integral ridge 21' subsequently passes along the casting section 2 and doctoring section 3, the membrane layer 15 gets cast and doctored with a uniform layer thickness onto both the inner wall of the support tube 8 as well as onto the ridges 21'. This can be seen in FIG. 4.

Figure 4:
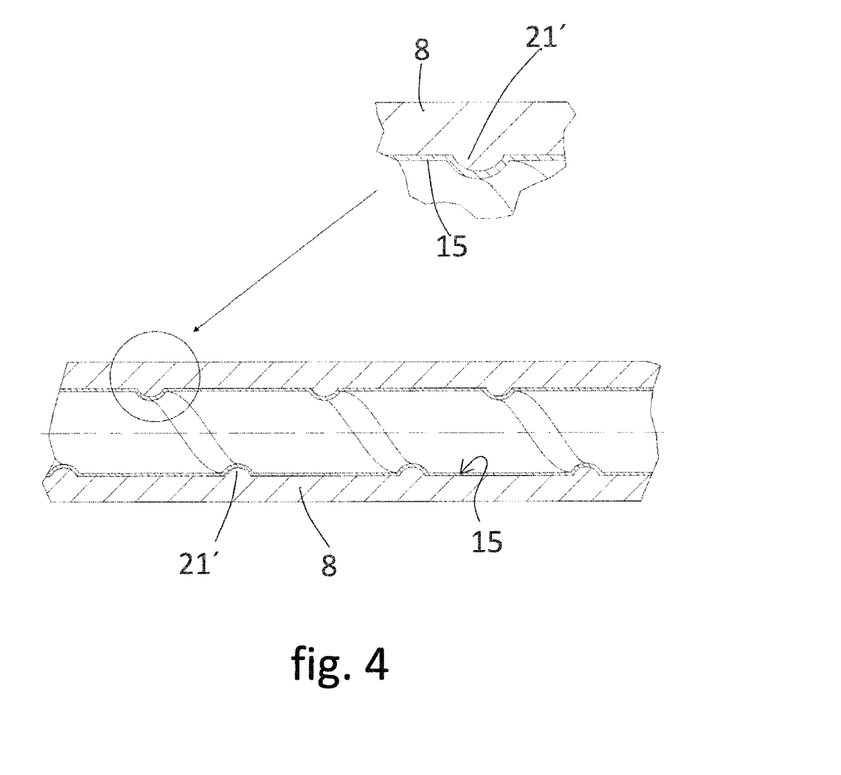
FIG. 4 shows a longitudinal section of a tubular membrane made with the apparatus of FIG. 3.

The pitch at which the helical ridge 21' gets wound around the winding section 1, is equal to the pitch at which the tape 5' gets wound and is thus dependent on the width of the tape 5' and the amount of overlap of the tape edges 6. The pitch of the helical grooves 20, 30 is made to correspond to this pitch of the helically wound ridge 21'. Furthermore it is noted that the downstream helical groove 20 is slightly larger dimensioned than the upstream helical groove 30, such that the membrane layer 15 can be casted and doctored with the aimed layer thickness on the ridge 21'.

Figure 5:
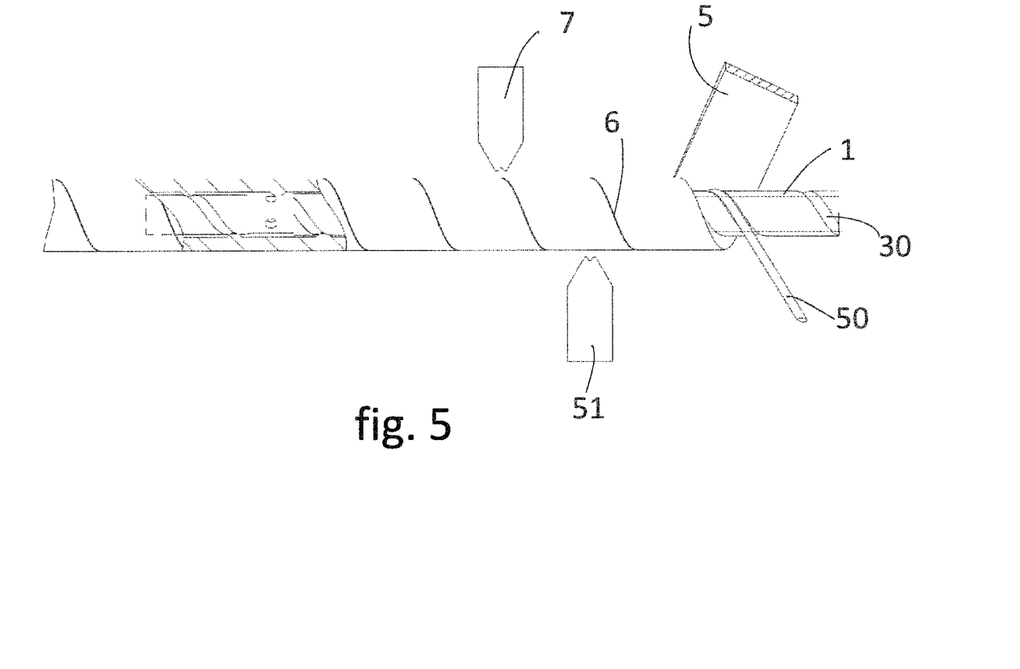
FIG. 5 schematically shows a third embodiment of an apparatus for producing tubular membranes according to the invention.
Figure 6:
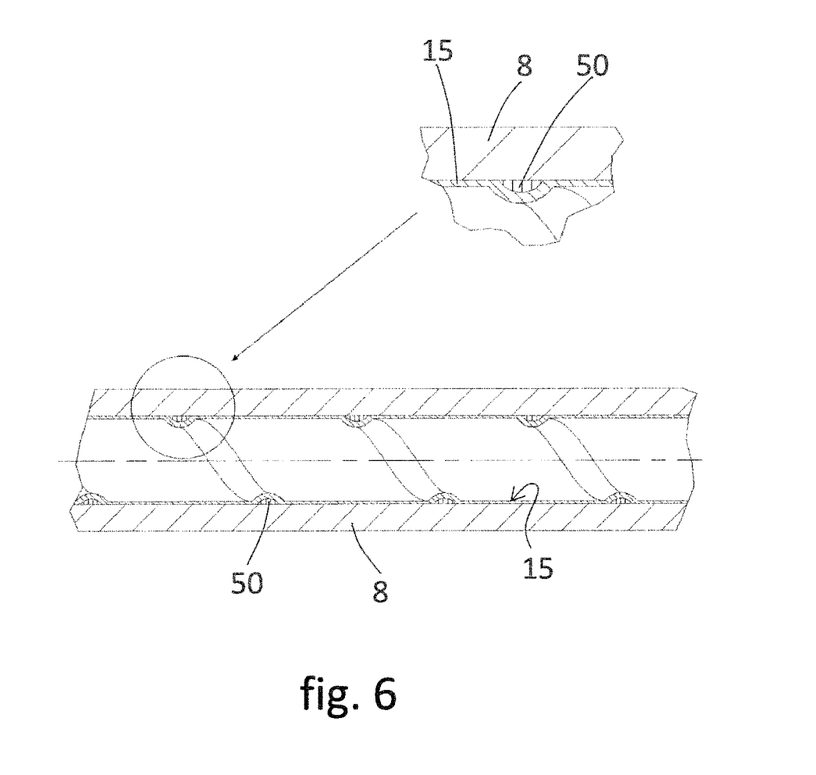
FIG. 6 shows a longitudinal section of a tubular membrane made with the apparatus of FIG. 5.

In FIG. 5 a third embodiment is shown. This time the tape 5 is supplied together with a distinctive separate ribbon-shaped ridge 50 towards the winding section 1. This ribbon-shaped ridge 50 is made of a similar type of porous material as the tape 5. During winding the ribbon-shaped ridge 50 gets to run through the downstream helical groove 30. At the winding section 1 now not only the overlapping tape edges 6 get sealed to each other by first sealing means 7, but also the ribbon-shaped ridge 50 gets sealed to the tape 5 by second sealing means 51. For its casting and doctoring section the apparatus of FIG. 5 is kept the same as in FIG. 3. In FIG. 6 the tubular membrane can be seen which is produced with the apparatus of FIG. 5.

Figure 7:
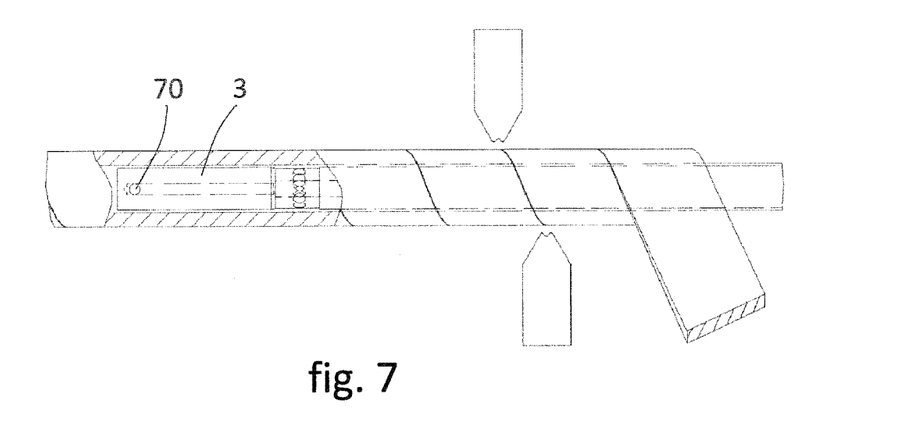
FIG. 7 schematically shows a fourth embodiment of an apparatus for producing tubular membranes according to the invention.

In FIG. 7 a fourth embodiment is shown. This time no helical grooves are provided in the mandrel. Instead at the free end of the doctoring section a nozzle/outlet opening 70 is provided which connects to the channel 12 for feeding pressurized membrane forming material to the nozzle/outlet opening 70. When the forward moving rotating support tube 8 with its already casted and doctored membrane layer 15 passes this nozzle/outlet opening 70, an inwardly projecting ridge gets automatically formed onto the membrane layer 15. By subsequently curing, leaching and/or drying the thus formed tubular membrane, a similar type as shown in FIG. 2 can be obtained, that is to say one with a semi-permeable helical ridge of membrane forming material inside a helically wound support tube.

Figure 8:
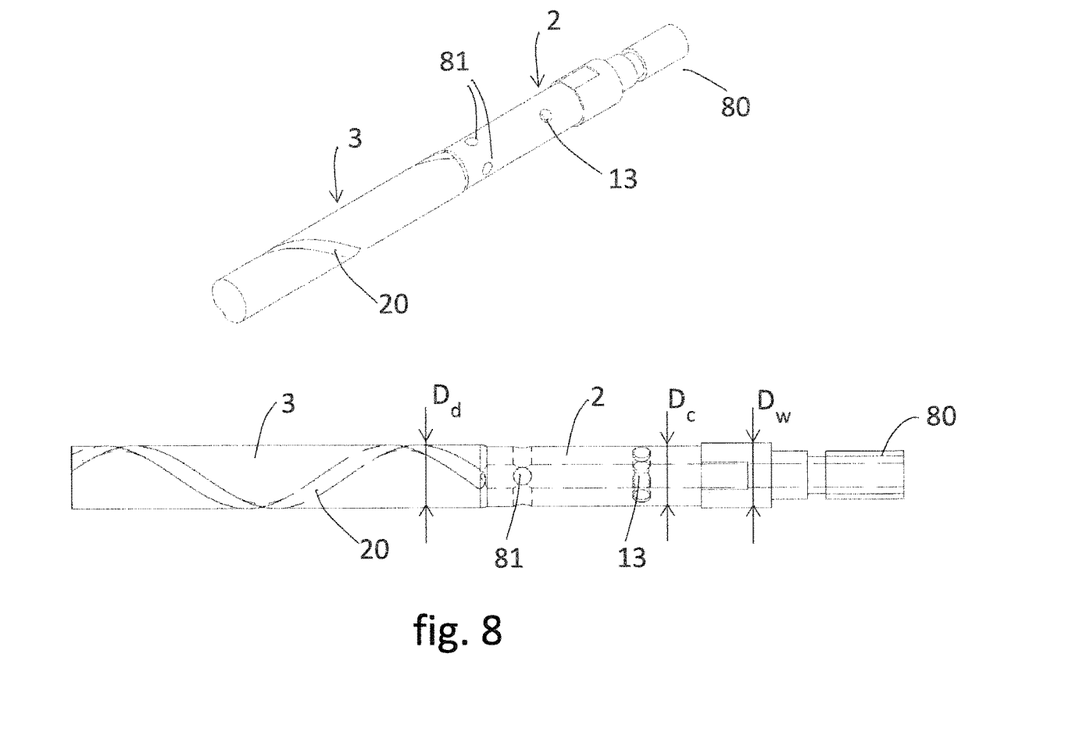
FIG. 8 shows in a side and perspective view of a variant of the casting and doctoring sections of the mandrel of FIG. 1.
Figure 9:
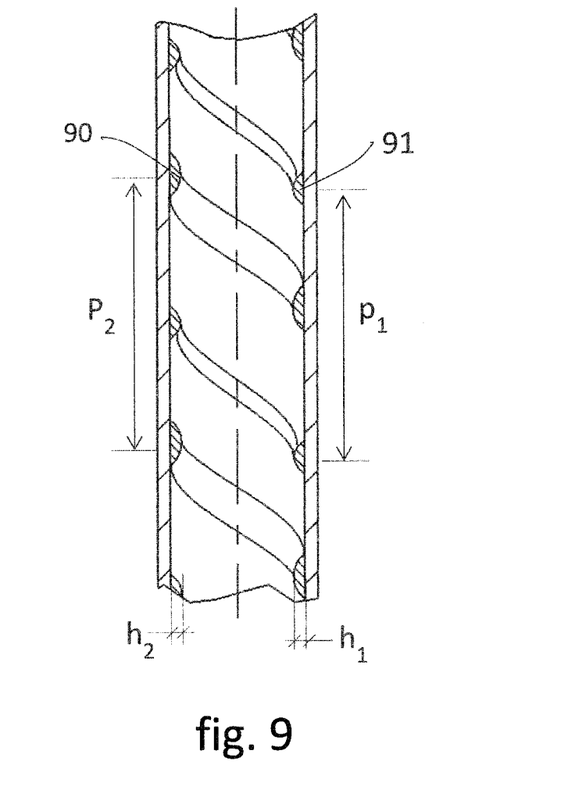
FIG. 9 shows a longitudinal section of a variant of a tubular membrane according to the present invention with two ridges.

Besides the above four embodiments numerous variants are possible. For example the dimensions and shapes of the helical ridge can easily be varied. The profile of the ridge can for example be made triangular, rectangular, semi-circular or any other shape. It has appeared that with the shown and described apparatus and method, tubular membranes having diameters which lie between 5-12 mm can efficiently be produced at industrial scale. It is noted though that diameters of between 1-25 mm are also deemed possible. The lengths of the various sections of the mandrel can be made longer or shorter whenever desired. Also it is noted that the mandrel with its various sections can be made out of one or more parts. In FIG. 8 a part of a mandrel is shown which mainly comprises the casting and doctoring section 2 and 3 as well as connection means 80 for connecting it to a winding section. With this the casting section 2 is made somewhat longer and comprises the plurality of outlet openings 13 for supplying membrane forming material to the feeding space at a downstream segment thereof, while some additional outlet openings 81 are provided at an upstream segment near the starting of the helical groove 20. Thus it can better be guaranteed that sufficient membrane forming material is fed at the casting section 2 for also having formed the ridge. Instead of merely forming one helical ridge it is also possible to form a plurality of ridges inside the helically wound tubular membrane. For this it suffices to provide a complementary number of helical grooves inside the doctoring section of the first embodiment, or to provide a complementary number of helical grooves inside the winding and doctoring section of the second or third embodiment, while supplying a tape with a complementary number of ridges, or to provide a complementary number of nozzles/outlet openings at the free end of the doctoring section of the fourth embodiment. The respective ridges then even can be given differing dimensions and shapes. For example FIG. 9 shows an embodiment with two helical ridges having a same pitch $p_1$, $p_2$, of which a first ridge 90 has a larger height $h_1$ than a height $h_2$ of a second ridge 91. Thus it has appeared that turbulences and secondary flows can be induced which even may lead to a further improved permeate flux-energy ratio.

Thus a helically wound tubular membrane is provided which can be made in one go at a suitable apparatus while at the same time having a porous or semi-permeable helical ridge formed thereon which causes advantageous turbulences and secondary flows to occur during filtration and thus lead to considerably higher permeate flux-energy ratios. The tubular membranes according to the invention can easily and quickly be made at low cost in an automated manner. Present apparatus for forming "smooth" helically wound tubular membranes can easily be transformed into ones according to the invention, simply by placing a helically grooved mandrel therein. The tubular membranes according to the invention can advantageously be used for all kinds of filtration process like (waste) water filtration, beer filtration, dairy filtration, etc.

The invention claimed is:

1. A tubular membrane, comprising:
    a support tube made out of one or more flexible tapes of porous support material which have been helically wound into a tube shape with overlapping tape edges which have been sealed to each other, wherein the support tube defines a fluid channel;

a semi-permeable membrane layer made of membrane forming material that is deposited on an inner wall of the support tube along the fluid channel; and wherein at least one inwardly projecting helical ridge is provided on said inner wall of the support tube, the helical ridge being covered with or forming part of the membrane layer, and wherein the inwardly projecting helical ridge projects into the membrane cross section for promoting turbulences and secondary flows.

2. The tubular membrane according to claim 1, wherein the ridge has been made out of the same porous material as the support tube.

3. The tubular membrane according to claim 1, wherein the ridge has been made out of the same semi-permeable material as the membrane layer.

4. The tubular membrane according to claim 1, wherein the ridge is a flexible ribbon-shaped ridge sealed to the tape and having been helically wound together therewith.

5. The tubular membrane according to claim 1, wherein two or more of said helical ridges are provided extending interspaced from each other along said inner wall.

6. The tubular membrane according to claim 1, wherein the support tube, the membrane layer and the helical ridge have been made in situ in one continuous go.

7. A method for producing a tubular membrane, comprising the steps:

making a support tube out of one or more flexible tapes of porous support material by having the tape(s) helically wound with overlapping tape edges into a tube shape around a winding section of a mandrel, with the support tube continuously rotating and moving forward relative to the mandrel while the overlapping tape edges are sealed to each other; and making a semi-permeable membrane layer of membrane forming material on an inner wall of the support tube;

wherein at least one inwardly projecting helical ridge is formed on said inner wall of the support tube, which helical ridge, during the making of the support tube and membrane layer, gets covered with or forms part of the membrane layer.

8. The method according to claim 7, wherein the ridge during its forming gets guided through one or more helical grooves in the mandrel.

9. The method according to claim 8, wherein the step of making the membrane layer comprises:

depositing a liquid dope of the membrane forming material onto said inner wall by guiding the support tube over a casting section of the mandrel, which casting section is fed with pressurized membrane forming material; and doctoring the deposited membrane forming material along said inner wall of the support tube by guiding them over a doctoring section of the mandrel, wherein during said doctoring the ridge is guided through a first one of said one or more helical grooves which for that is present in the doctoring section of the mandrel.

10. The method according to claim 9, wherein, during said casting and doctoring of the membrane layer, the ridge is cast of semi-permeable membrane forming material onto or together with the membrane layer.

11. The method according to claim 9, wherein, preceding said casting and doctoring of the membrane layer, the ridge is formed by a flexible ribbon-shaped ridge which is helically wound together with the tape(s) around the winding section of the mandrel, and wherein during said winding the ribbon-shaped ridge is guided through a second one of said one or more helical grooves which for that is present in the winding section of the mandrel.

12. The method according to claim 11, wherein the ribbon-shaped ridge is fed to the winding section separate from the tape, and gets sealed to the tape along the winding section.

13. An apparatus for producing a tubular membrane according to claim 1, comprising:

a mandrel having at least a winding and a casting section;

feeding means for feeding the tape(s) to the winding section;

drive means for continuously rotating and moving forward the support tube relative to the mandrel;

sealing means positioned alongside the winding section for sealing the overlapping tape edges to each other; and feeding means for feeding the casting section with pressurized membrane forming material, wherein one or more helical grooves are provided in the mandrel for guiding the at least one inwardly projecting helical ridge through during its forming on the inner wall of the support tube.

14. The apparatus according to claim 13, wherein the mandrel comprises a doctoring section for doctoring the deposited membrane forming material along said inner wall of the support tube by guiding them over this doctoring section, and wherein a first one of the one or more helical grooves is present in the doctoring section of the mandrel.

15. The apparatus according to claim 14, wherein a second one of the one or more helical grooves is present in the winding section of the mandrel.

* * * * *